(12) United States Patent
Mann, Jr. et al.

(10) Patent No.: US 11,241,834 B2
(45) Date of Patent: Feb. 8, 2022

(54) AUTOMATED VIBRATIONAL POWDER REMOVAL FOR ADDITIVE MANUFACTURING

(71) Applicant: The Boeing Company, Chicago, IL (US)

(72) Inventors: Robert L. Mann, Jr., Puyallup, WA (US); Hayden S. Osborn, Seattle, WA (US); Alexander J. Coco, Seattle, WA (US)

(73) Assignee: The Boeing Company, Chicago, IL (US)

(*) Notice: Subject to any disclaimer, the term of this patent is extended or adjusted under 35 U.S.C. 154(b) by 107 days.

(21) Appl. No.: 16/843,099

(22) Filed: Apr. 8, 2020

(65) Prior Publication Data

US 2021/0316508 A1   Oct. 14, 2021

(51) Int. Cl.
| | |
|---|---|
| *B29C 64/35* | (2017.01) |
| *B29C 64/379* | (2017.01) |
| *B29C 64/393* | (2017.01) |
| *B29C 64/371* | (2017.01) |
| *B33Y 40/20* | (2020.01) |
| *B29C 64/153* | (2017.01) |
| *B33Y 10/00* | (2015.01) |
| *B33Y 30/00* | (2015.01) |
| *B33Y 50/02* | (2015.01) |
| *B29C 64/245* | (2017.01) |
| *B29C 64/188* | (2017.01) |

(52) U.S. Cl.
CPC .......... *B29C 64/35* (2017.08); *B29C 64/188* (2017.08); *B29C 64/245* (2017.08); *B29C 64/371* (2017.08); *B29C 64/379* (2017.08); *B29C 64/393* (2017.08); *B29C 64/153* (2017.08); *B33Y 10/00* (2014.12); *B33Y 30/00* (2014.12); *B33Y 40/20* (2020.01); *B33Y 50/02* (2014.12)

(58) Field of Classification Search
None
See application file for complete search history.

(56) References Cited

U.S. PATENT DOCUMENTS

| | | | | |
|---|---|---|---|---|
| 4,566,520 A | * | 1/1986 | Shebuski | ............... B22D 29/00 164/131 |
| 2017/0036401 A1 | * | 2/2017 | Donovan | .............. B29C 64/357 |

* cited by examiner

*Primary Examiner* — Matthew J Daniels
*Assistant Examiner* — Paul Spiel
(74) *Attorney, Agent, or Firm* — Quinn IP Law (57) ABSTRACT

A system for removing residual powder from a three-dimensional (3D)-printed component integrally constructed with a build plate during an additive manufacturing (AM) process includes an end-effector, an enclosure, one or more transducers, and an electronic control unit (ECU). The end-effector includes a base surrounded by a perimeter flange, and includes a through-opening that receives the build plate. A perimeter clamp attaches and seal the enclosure to a perimeter flange of the end-effector such that the enclosure, the base, and the build plate collectively form a powder containment cavity. The transducers vibrate at a predetermined frequency or range thereof. The ECU transmits a vibration control signal to the transducers during a post-processing stage of the AM process to loosen and remove the residual powder from the component and collect the loosened powder within the powder containment cavity.

19 Claims, 3 Drawing Sheets

AUTOMATED VIBRATIONAL POWDER REMOVAL FOR ADDITIVE MANUFACTURING

BACKGROUND

The process of additive manufacturing, also referred to as three-dimensional (3D) printing, enables the rapid construction of components having simple or highly complex internal or external surface geometries. Additive manufacturing processes are often used to fabricate 3D-printed components during rapid prototyping efforts, as well as to fabricate low-volume or out-of-production replacement parts. Additionally, the evolution of high-resolution scanning and printing equipment for use with a wide range of metal powder feedstock has enabled additive manufacturing to serve as a viable production option, with the associated cost of producing 3D-printed metal components comparing favorably to conventional metal forming processes such as casting, forging, and injection molding.

3D-printed components produced by metal additive manufacturing processes have tremendous utility in a wide variety of industries and applications, including but not limited to specialized aerospace components and medical devices. An advantage of additive manufacturing or 3D-printing is the unique ability to fabricate lightweight one-piece monolithic components regardless of geometric complexity. For instance, the ability to craft intricate propulsion system nozzles, combustion chambers, and turbine fan blades in a controlled layer-by-layer fashion using specialized metal alloys has the distinct advantage of streamlining the manufacturing process and reducing part count.

Additive manufacturing processes generally commence with the creation of a working design of the particular component to be 3D-printed, for instance using Computer-Aided Engineering (CAE) techniques. As will be appreciated by those of ordinary skill in the art, CAE typically utilizes finite element analysis (FEA) or other suitable techniques to create a working 3D-model. Modeling efforts may be performed using off-the-shelf Computer-Aided Design (CAD) or Computer-Aided Manufacturing (CAM) software. Once a suitable model has been constructed, simulations may be run on the model in order to test the modeled component's performance across a range of static and dynamic conditions under which the additive part is expected to operate.

The 3D model may be revised as needed based on the results of the above-noted simulations. Once an acceptable simulation result is observed, the model is uploaded to a 3D printer for construction of a physical specimen of the modeled component. The printer hardware is thereafter used to construct the specimen in a layer-by-layer manner, e.g., by progressively melting application-suitable powder feedstock in a particular pattern using a concentrated laser or electron beam. Unused or residual powder feedstock is then removed to reveal the fully-formed 3D-printed component, typically by vacuuming bulk powder stock from a build tank and thereafter manually brushing the powder from the component. Such efforts are sometimes assisted by a water flush or compressed air. The component is then subjected to additional post-processing techniques such as build plate separation, thermal stress relief, and buffing, polishing, or grinding.

SUMMARY

Disclosed herein are manufacturing processes and associated tooling hardware that together facilitate loosening, removal, and collection of residual metal powder stock during an additive manufacturing (AM) process, with the AM process also colloquially referred to in the art and hereinbelow as a three-dimensional (3D) printing process.

As described generally above, a 3D-printed component is progressively constructed layer-by layer, for example in a build tank of a powder bed fusion system using a laser beam, electron beam, or other suitable concentrated heat source. The component subsequent to printing may be buried in or coated with unused/residual powder, some of which may be entrapped deep within passages, crevices, and cavities of the component. This residual powder must be removed from the component prior to performing certain post-processing steps such as thermal stress relief, where elevated temperatures within a stress relief over can sinter the residual powder to the component's surfaces. It is recognized herein that manual processes for removing the residual powder may inadvertently pack the powder more deeply into the component, and may also discharge residual powder into the surrounding atmosphere.

To this end, an automatic vibration-based mechanical solution is applied to the above-noted problem of efficiently and effectively removing impacted residual powder from a 3D-printed component formed via an AM process. An exemplary approach includes grasping the component using an end-effector, e.g., of a six-axis industrial robot or other multi-axis serial robot. Transducers are mechanically coupled to the component, either directly or indirectly, such as by connecting the transducers to a build plate that is integrally formed with or welded to the component during the AM process. The component and working surfaces of the end-effector are then fully encapsulated within an enclosure having a single open end, e.g., a hemispherical dome, bag, box, cylinder, or other single open-ended containment structure.

Once the enclosure is connected and hermetically sealed to the end-effector, a powder containment cavity bounded in part by the enclosure may be filled with an application-specific inert gas such as argon or nitrogen. The transducers are then activated via an electronic control unit (ECU) to cause the transducers to vibrate at a predetermined frequency or range thereof. The generated vibration energy is directed into the component directly or through intervening structure.

A non-limiting representative embodiment of the present system includes an end-effector, an enclosure, a perimeter clamp, one or more transducers, and an ECU. The end-effector includes a planar base surrounded by a perimeter flange, with the base including a window or through-opening configured to receive the build plate therein. The perimeter clamp attaches and seals the enclosure to the perimeter flange of the end-effector, such that the enclosure, the base, and the build plate collectively form the powder containment cavity noted above.

The transducers in this particular embodiment are connected to the build plate and/or the base of the end-effector. When activated by vibration control signals, the transducers are caused to vibrate at a predetermined frequency, e.g., a discrete frequency or a range of frequencies possibly including but not necessarily limited to ultrasonic frequencies. The ECU, which is in communication with the individual transducers, selectively transmits the vibration control signals to the transducers during a post-processing stage of the AM process, for a duration sufficient for loosening the powder for easy separation from the component. This action has the effect of gently loosening and removing the residual powder from the component, with the loosened powder thereafter captured within the cavity to facilitate disposal, recycling, or reuse of the residual powder.

The build plate in certain embodiments is a rectangular substrate or plate having opposite first and second major surfaces. The component is attached to and projects radially from the first major surface, with one or more of the transducers being connected to the second major surface, i.e., an underside of the build plate.

The enclosure may be embodied as a solid hemispherical dome constructed, for instance, from an application-suitable transparent material such as impact-resistant plastic. The perimeter clamp in such an embodiment may be embodied as an annular clamping ring.

The base of the end-effector may include at least one vacuum port configured to connect to a vacuum device, e.g., a vacuum pump, as well as one or more gas ports configured to connect to a pressurized supply of inert gas.

The ECU may be optionally programmed with multiple vibration control profiles each corresponding to a different predetermined configuration of the component. The ECU selectively activates the transducers using one of the vibration control profiles that corresponds to the actual configuration of the component, possibly as identified to the ECU or by the ECU using an electronic signal.

The system in some embodiments includes a human-machine interface device which transmits the electronic signal to the ECU in response to an input request, e.g., from an operator.

In some configurations, the disclosed system may include a multi-axis serial robot connected to the end-effector such that the end-effector forms a distal end link of the robot. The ECU may be used in such an embodiment to control gross or macro motion of the robot concurrently with selectively activating the transducers.

A method is also disclosed herein for removing residual powder from a 3D-printed component. An exemplary embodiment of the method includes printing the component via an AM process, with the component being integrally formed with a build plate during the AM process. The method includes engaging the build plate using an end-effector having a base surrounded by a perimeter flange, with such engagement including inserting the build plate into a through-opening of the base. As part of the method, an enclosure is attached to the end-effector via a perimeter clamp to seal the enclosure to a perimeter flange of the end-effector. The enclosure, base, and build plate collectively form a powder containment cavity in which the component is encapsulated.

The method according to this embodiment includes connecting transducers to the build plate and/or base, with the transducers being configured to vibrate at a predetermined frequency/frequency range in response to vibration control signals. Thereafter, the method includes transmitting the vibration control signals from an ECU to the transducers during a post-processing stage of the AM process for a duration sufficient for loosening the residual power. The residual powder is thereafter captured within the powder containment cavity.

Another embodiment of the present system includes an end-effector configured to connect to a distal end plate of a six-axis serial robot, and having a circular base surrounded by an annular perimeter flange. The end-effector of this embodiment includes a rectangular through-opening configured to receive the build plate. The base includes a pair of vacuum ports configured to connect to a vacuum pump, and a pair of gas ports configured to connect to a pressurized supply of an application-suitable inert gas such as argon or nitrogen.

A hemispherical dome of the system is constructed of transparent plastic, with an annular perimeter clamping ring configured to attach and seal the hemispherical dome to the annular perimeter flange of the end-effector. The hemispherical dome, the circular base, and the build plate collectively form a powder retention cavity fully encapsulating the component. Transducers are connected to opposite major surfaces of the build plate and configured, when activated by vibration control signals, to vibrate at a predetermined ultrasonic frequency.

An ECU in communication with the serial robot and the transducers is configured, during a post-processing stage of the AM process, to selectively transmit robot control signals to the serial robot to control motion of the serial robot while transmitting the vibration control signals to the one or more transducers. These actions have the effect of loosening and removing the residual powder from the component, with the residual powder thereafter captured or collected within the powder containment cavity.

The above summary is not intended to represent every embodiment or every aspect of the present disclosure. Rather, the foregoing summary merely provides an illustration or exemplification of some of the novel concepts and features set forth herein. The above-noted and other features and advantages will be readily apparent from the following detailed description of illustrated embodiments and representative modes for carrying out the disclosure when taken in connection with the accompanying drawings and appended claims. Moreover, the present disclosure expressly includes combinations and sub-combinations of the various elements and features presented herein.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Additionally, the term "exemplary" as used herein means "serving as an example, instance, or illustration", and thus does not indicate or suggest relative superiority of one disclosed embodiment relative to another. Words of approximation such as "about", "substantially", "approximately", and "generally" are used herein in the sense of "at, near, or nearly at", "within ±5% of", "within acceptable manufacturing tolerances", or logical combination thereof.

Figure 1:
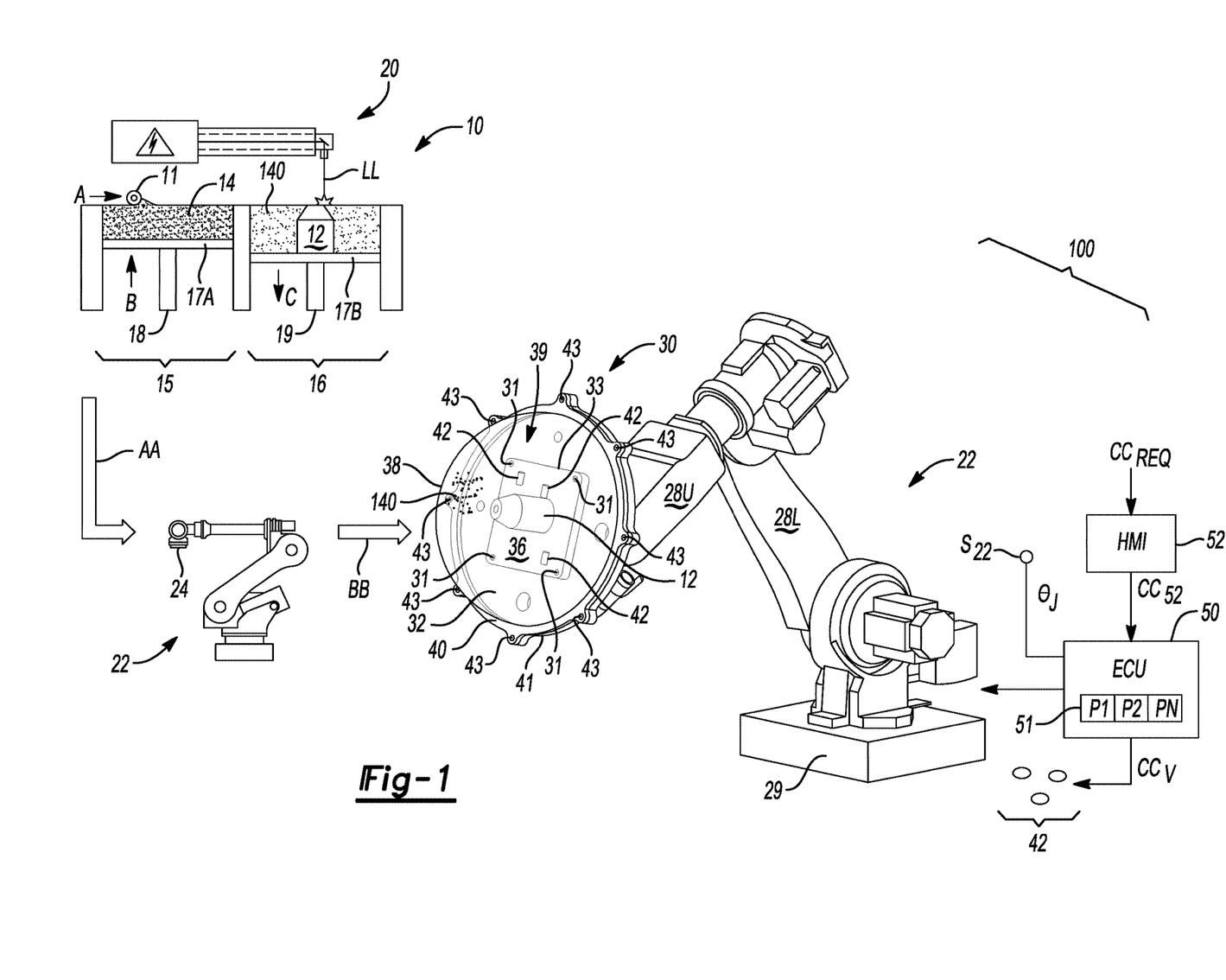
FIG. 1 is a schematic flow diagram of an exemplary additive manufacturing (AM) process that utilizes a system constructed and controlled as described herein in order to apply targeted vibration energy to a three-dimensional (3D)-printed component during a post-processing stage of the AM process for the purpose of loosening and removing residual powder from the component.

Referring to the drawings, wherein like reference numbers refer to like features throughout the several views, FIG. 1 schematically depicts an exemplary additive manufacturing (AM) or three-dimensional (3D) printing process that utilizes a system 100 configured as set forth herein to apply vibration energy to a 3D-printed component 12 during a post-processing stage of the AM process. Such vibration energy is directed into the component 12 in a targeted manner in order to gently loosen and remove residual powder from passages, crevices, or cavities of the component 12.

As will be appreciated by those of ordinary skill in the art and as generally described above, metal-based AM or 3D printing processes may entail the use of a powder bed fusion process 10 and a concentrated heat source 20, such as but not limited to an electron beam or laser beam LL as shown, in order to progressively melt powder stock 14 and thereby build the 3D-printed component 12 in an accumulative or progressive/layer-by-layer manner. The powder bed fusion process 10 may position a volume of the powder stock 14 on a moveable supply platform 17A within a powder feed chamber 15, with a leveling roller 11 translating across the powder feed chamber 15 in the direction of arrow A. This enables the leveling roller 11 to move a thin layer of the powder stock 14 toward an adjacent build chamber 16 as the supply platform 17A rises in the direction of arrow B, e.g., using a hydraulic or pneumatic piston 18.

Once the leveling roller 11 deposits some of the powder stock 14 onto a moveable build platform 17B or a previously formed layer of the 3D-printed component 12, the heat source 20 directs the beam LL onto the deposited powder stock 14 according to a predetermined pattern to thereby construct a layer of the component 12. Once the layer has been constructed in this manner, the build platform 17B is lowered the direction of arrow C using a piston 19 to enable another layer of the component 12 to be formed. Piston 19 is analogous to the piston 18, but is actuated in the opposite direction. The process repeats until the component 12 has been fully printed.

Use of the powder bed fusion process 10 in this manner results in the constructed 3D-printed component 12 being buried in or coated by residual powder 140, i.e., an unused quantity of the powder stock 14. A typical AM process will seek to remove most of the residual powder 140 from the build chamber 16, e.g., using vacuum suction, compressed air, or pressure washing techniques, with such actions possibly assisted by manual brushing. However, the component 12 may have a highly-intricate surface geometry that tends to entrap some of the residual powder 140. The present system 100 and associated methods of use thereof are thus intended to help remove entrapped or impacted residual powder 140 from the component 12 prior to subsequent post-processing stages.

To this end, the system 100 of FIG. 1 includes an end-effector 30 that works in conjunction with a multi-axis serial robot 22 to dynamically and gently loosen the residual powder 140 from the 3D-printed component 12, and to facilitate removal and reuse, recycling, or disposal thereof. As indicated by arrows AA and BB, the component 12 may be grasped by the serial robot 22 at a distal end thereof, i.e., a mounting/end plate 24, with motion of the serial robot 22 possibly controlled as part of the present approach. Ideally, 100% vibration insulation is provided between the end plate 24 and the end-effector 30, e.g., using a carbon fiber block or other suitable materials to dampen mechanical vibration imparted to the component 12 as part of the present strategy.

As will be appreciated by one of ordinary skill in the art, an industrial robot such as the illustrated serial robot 22 typically has a base 29 and respective upper and lower control arms 28U and 28L connected by a set of revolute joints, with the serial robot 22 providing at least six control axes that collectively provide six control degrees of freedom. Once the end-effector 30 has been attached to the serial robot 22, removal of the residual powder 140 from the 3D-printed component 12 may commence via programmed control functionality of the present system 100.

Still referring to FIG. 1, the 3D-printed component 12 is integrally constructed with a build plate 36 during the above-noted AM process. That is, the progressive or accumulative nature of the AM process ensures that the component 12 is essentially integrally welded to the build plate 36, thereby requiring post-processing separation techniques such as electrical discharge machining or band sawing to cleanly separate and detach the component 12 from the build plate 36. Prior to conducting such efforts, the system 100 may be used to help remove the residual powder 140 from the component 12 using the end-effector 30 and other structural components of the system 100 in accordance with the present disclosure.

In the illustrated embodiment of FIG. 1, the end-effector 30 includes a planar base 32 having, i.e., surrounding and thus defining, a window or through-opening 33. The base 32 may be embodied as a solid floor constructed of an application-suitable material such as plastic, steel, or aluminum. The through-opening 33 present in the base 32 is configured, i.e., sized and shaped, to receive the build plate 36 therein. For example, the build plate 36 may be rectangular or square as shown for illustrative purposes, with other sizes and/or shapes being possible within the scope of the disclosure. Thereafter, the build plate 36 is secured to the base 32, such as using perimeter fasteners 31 or other suitable attachment mechanisms.

Figure 2:
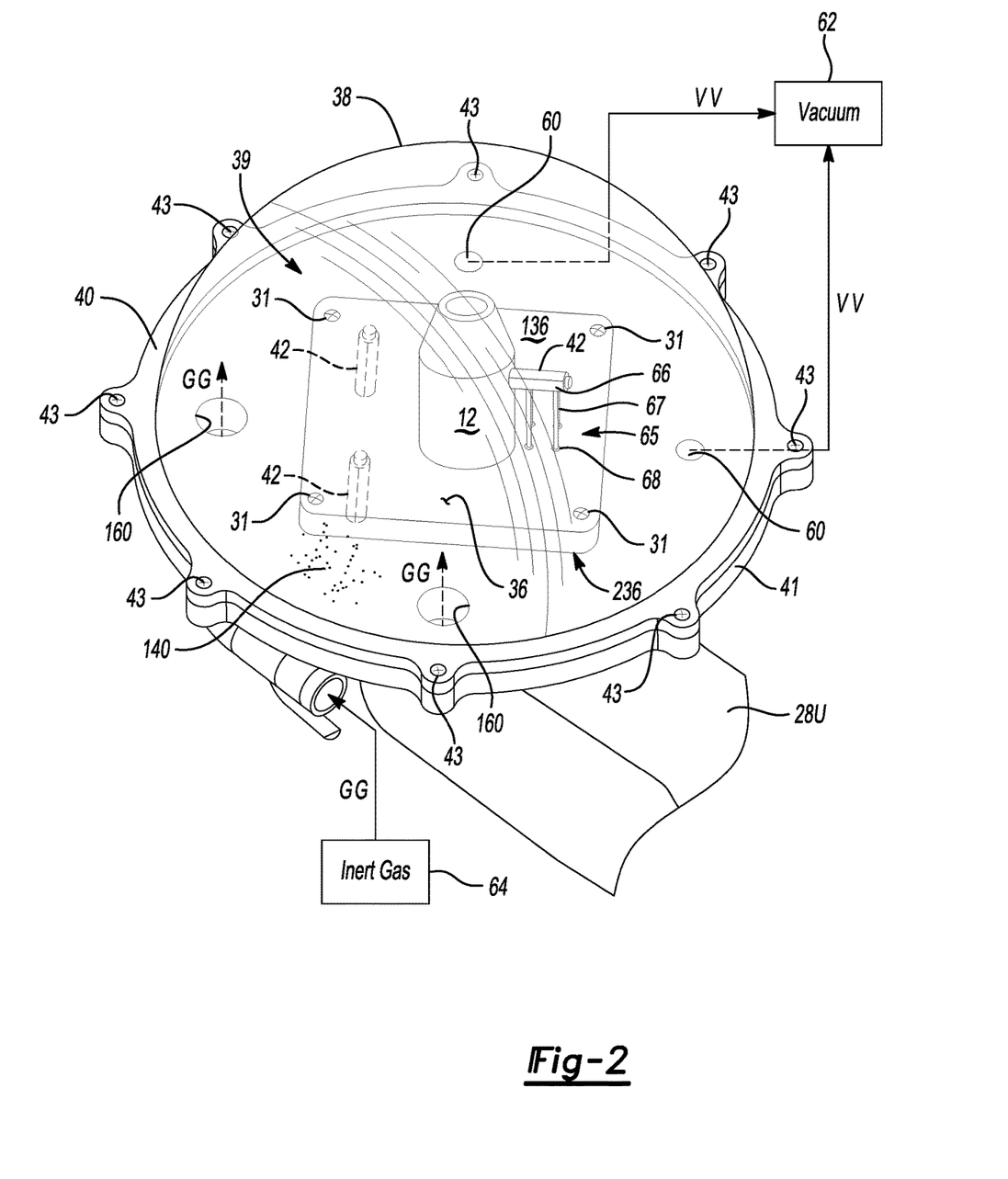
FIG. 2 is a schematic perspective view illustration of an exemplary end-effector configured for use during a post-processing stage of the AM process depicted in FIG. 1.

The end-effector 30 is attached to a single open-ended and generally or fully convex enclosure 38 that is impermeable to the residual powder 140. A perimeter clamp 40 is configured to attach and seal to a perimeter flange 41 of the base 32, such that the enclosure 38, the base 32, and the build plate 36 collectively encapsulate the 3D-printed component 12 and form a powder containment cavity 39. The enclosure 38 in the depicted non-limiting embodiment of FIGS. 1 and 2 is a solid hemispherical dome, and thus has a circular perimeter. In such an embodiment, the above-noted perimeter clamp 40 is an annular or ring-shaped clamping ring as depicted. To facilitate visibility of the component 12 when encapsulated within the cavity 39, the hemispherical dome or other configuration of the enclosure 38 may be constructed of a transparent material such as impact-resistant glass or an impact-resistant plastic material such as acrylic, polycarbonate, polyethylene (PE), polylactic acid (PLA), polyethylene terephthalate (PET), etc.

Within the scope of the disclosure, the system 100 also includes one or more transducers 42. Each transducer 42 is connected to one or both opposing major surfaces 136 or 236 of the build plate 36, to the base 32, and/or to the 3D-printed component 12. The transducers 42 are configured to convert input energy from vibration control signals (arrow $CC_V$) to vibration energy at a predetermined frequency. By way of example and not limitation, the transducers 42 may be variously embodied as magnetostrictive transducers, piezoelectric crystals, or other suitable transducer hardware outputting the predetermined vibration frequency.

The predetermined frequency may be a single discrete frequency, a randomized frequency, or a swept range of calibrated frequencies in different embodiments. The particular frequency or range thereof, as well as points of application of the constituent vibration energy, are possibly preselected to correspond to the component 12. The frequency of vibration and possibly the amplitude may be based on the present position of the end-effector 30 in free space, e.g., a Cartesian XYZ coordinate system, during active gross motion control of the serial robot 22, for instance by changing the frequency and/or amplitude of vibration whenever the component 12 is inverted to help separate loosened residual powder 140 from the component 12.

In some embodiments, the transducers 42 may vibrate at a preselected single/discrete ultrasonic frequency, e.g., 20 kHz, 40 kHz, 60 kHz, 80 kHz, 100 KHz, etc., or within a calibrated ultrasonic frequency range, such as about 20 kHz to about 80 kHz. Ultrasonic frequencies are generally understood in the art to extend beyond 20 kHz to as high as 20 MHz. The actual frequency of vibration or frequency range may vary, with different frequencies and possibly amplitudes used for different embodiments of the component 12 as set forth below. When activated by the vibration control signals (arrow $CC_V$), the transducers 42 will resonate at the predetermined frequency for a calibrated duration sufficient for loosening and ultimately removing the loosened residual powder 140 from the component 12. Such a duration and frequency/frequency range may be determined offline as a calibration value and used in the programming of an associated electronic control unit (ECU) 50, with the ECU 50 configured to regulate operation of the system 100 as set forth herein.

The ECU 50, which is in wired or wireless communication with the various transducers 42, is configured to selectively transmit the vibration control signals (arrow $CC_V$) to the transducers 42 during a post-processing stage of the AM process noted above. Receipt of the vibration control signals (arrow $CC_V$) by the transducers 42 causes the transducers 42 to vibrate, as noted above, in a manner that depends on the particular operating principle of the transducers 42. The ECU 50 may also receive measured joint angles (arrow $\theta_J$) from joint angle sensors $S_{22}$ of the serial robot 22, one of which is shown for illustrative simplicity to represent the collective set. In some embodiments, the ECU 50 may respond to the measured joint angles (arrow $\theta_J$) by transmitting robot control signals (arrow $CC_R$) to individual joint actuators of the serial robot 22. Such an approach would allow the ECU 50 to optimize removal of the residual powder 140 by coordinating control of gross motion (macro-movements) of the robot 22 with control of the fine vibrational motion (micro-movements) imparted to the component 12 by the transducers 42.

While depicted as a unitary control module in FIG. 1 for illustrative simplicity, the ECU 50 may be physically embodied as one or more electronic control units or processing nodes each having application-sufficient memory and associated hardware and software, such as but not limited to a high-speed clock, timer, input/output circuitry, buffer circuitry, and the like. Memory may include sufficient amounts of read only memory, for instance magnetic or optical memory. Instructions embodying a control method may be programmed as computer-readable instructions and executed during operation of the system 100. The ECU 50 may encompass one or more control modules, logic circuits, application-specific integrated circuits (ASICs), central processing units (CPUs), microprocessors, and/or other requisite hardware as needed to provide the programmed functionality described herein.

The ECU 50 may be optionally programmed with multiple vibration control profiles 51, which are labeled P1, P2, . . . , PN for added clarity. Each individual vibration control profile 51 may correspond to a different predetermined configuration of the 3D-printed component 12, with input signals ($CC_{52}$) to the ECU 50 or generated thereby possibly identifying an actual configuration of the 3D-printed component 12. In such an embodiment, the ECU 50 may selectively activate the transducers 42 according to the particular vibration control profile 51 that corresponds to the identified actual configuration of the component 12.

A human-machine interface (HMI) device 52 may be used according to some implementations of the system 100. For example, the HMI device 52 may be a touch screen device, a keyboard, or a keypad of the types typically used as part of a programmable logic controller or PLC architecture in a plant environment. The HMI device 52 may be configured to identify the actual configuration via the input signals (arrow $CC_{52}$) to the ECU 50, doing so in response to an input request ($CC_{REQ}$), e.g., from an operator of the system 100, or the HMI device 52 may receive such a request automatically or autonomously, e.g., via communication with an external process controller (not shown).

As part of the present approach, representative embodiments of the system 100 may encompass the multi-axis serial robot 22 and macro-control thereof. For instance, the end-effector 30 may be connected to the above-noted end plate 24 of the serial robot 22, such that the end-effector 30 forms a distal end link of the serial robot 22. Thus, motion of the serial robot 22 in free space/Cartesian space would have the effect of rotating and/or translating the end-effector 30 and the connected enclosure 38 with the 3D-printed component 12 encapsulated therein. The ECU 50 may be configured to control such macro-motion of the serial robot 22 concurrently with selectively activating the transducers 42, thereby ensuring cooperative macro-motion control of the serial robot 22 with micro-motion control of the transducers 42 to effectively separate and remove entrapped residual powder 140 from the component 12.

Referring briefly to FIG. 2, a simplified representation of the 3D-printed component 12 is depicted to facilitate the following discussion as the component 12 would appear when encapsulated within the powder containment cavity 39. As noted above, alternative configurations may be envisioned for the enclosure 38, shown in FIG. 2 as a transparent hemispherical shell or bubble. Exemplary alternative configurations include, by way of example and not limitation, flexible or rigid bags or single open-ended reservoirs forming a hermetic seal around the perimeter of the base 32, or solid configurations of non-spherical shapes such as boxes or containment cylinders. Thus, the illustrated configuration is intended to be illustrative of just one possible configuration of the enclosure 38. In the various embodiments of the enclosure 38, the perimeter clamp 40 forms an air-tight seal against the perimeter flange 41 of the base 32 when the enclosure 38 is securely fastened into place, e.g., using fasteners 43 such as threaded bolts or other suitable attachment devices.

The base 32 in the illustrated embodiment of FIG. 2 includes service ports 60 and 160, e.g., circular holes or fluid passages extending entirely through the base 32. The service ports 60 may be configured to operate as vacuum ports, and thus may be configured to connect to a vacuum device 62, e.g., a vacuum pump. Similarly, the service ports 160 may include one or more gas ports each configured to connect to a pressurized inert gas supply 64, e.g., a pressurized canister of an application-suitable inert gas such as argon or nitrogen.

Due to the possibility that some of the residual powder 140 in the powder containment cavity 39 is highly diffuse and airborne, the present process may also entail vacating the atmosphere within the powder containment cavity 39 by creating a controlled vacuum (arrow VV) via the vacuum device 62 once the 3D-printed component 12 has been encapsulated within the cavity 39. At the same time, the process may include pumping argon, nitrogen, or another application-suitable inert gas (arrow GG) into the cavity 39 via the inert gas supply 64. Once the atmosphere within the cavity 39 is pressurized with inert gas, the ECU 50 may commence energizing of the transducers 42.

As part of the present approach, the transducers 42 may be attached to the build plate 36 at strategic positions relative to the 3D-printed component 12, with the build plate 36 possibly having first and second major surfaces 136 and 236 as noted above. For instance, one or more of the transducers 42 may be attached directly to the second major surface 236 of the build plate 36, i.e., the underside of the build plate 36, or to the first major surface 136, i.e., the top side of the build plate 36 to which the 3D-printed component is attached. In such an embodiment, the transducers 42 would vibrate the build plate 36 and, via conduction, the component 12 connected thereto.

Alternatively, or concurrently, one or more of the transducers 42 may be attached to an indexing feature 65 and placed in direct contact with a predetermined surface of the 3D-printed component 12. For example, the indexing feature 65 may be embodied as a lightweight plastic cradle 66 having a plurality of legs 67 as shown, with the legs 67 being inserted into mating holes 68 in the build plate 36. Using such an indexing feature 65, one or more of the transducers 42 may be supported alongside the component 12, with an end of the transducer 42 situated in such a manner being pressed into direct contact with the component 12. The size, shape, and orientation of such an indexing feature 65 may be customized to the configuration of the component 12, and therefore the simplified embodiment of the indexing feature 65 shown in FIG. 2 is intended to be non-limiting and illustrative of the present teachings.

Figure 3:
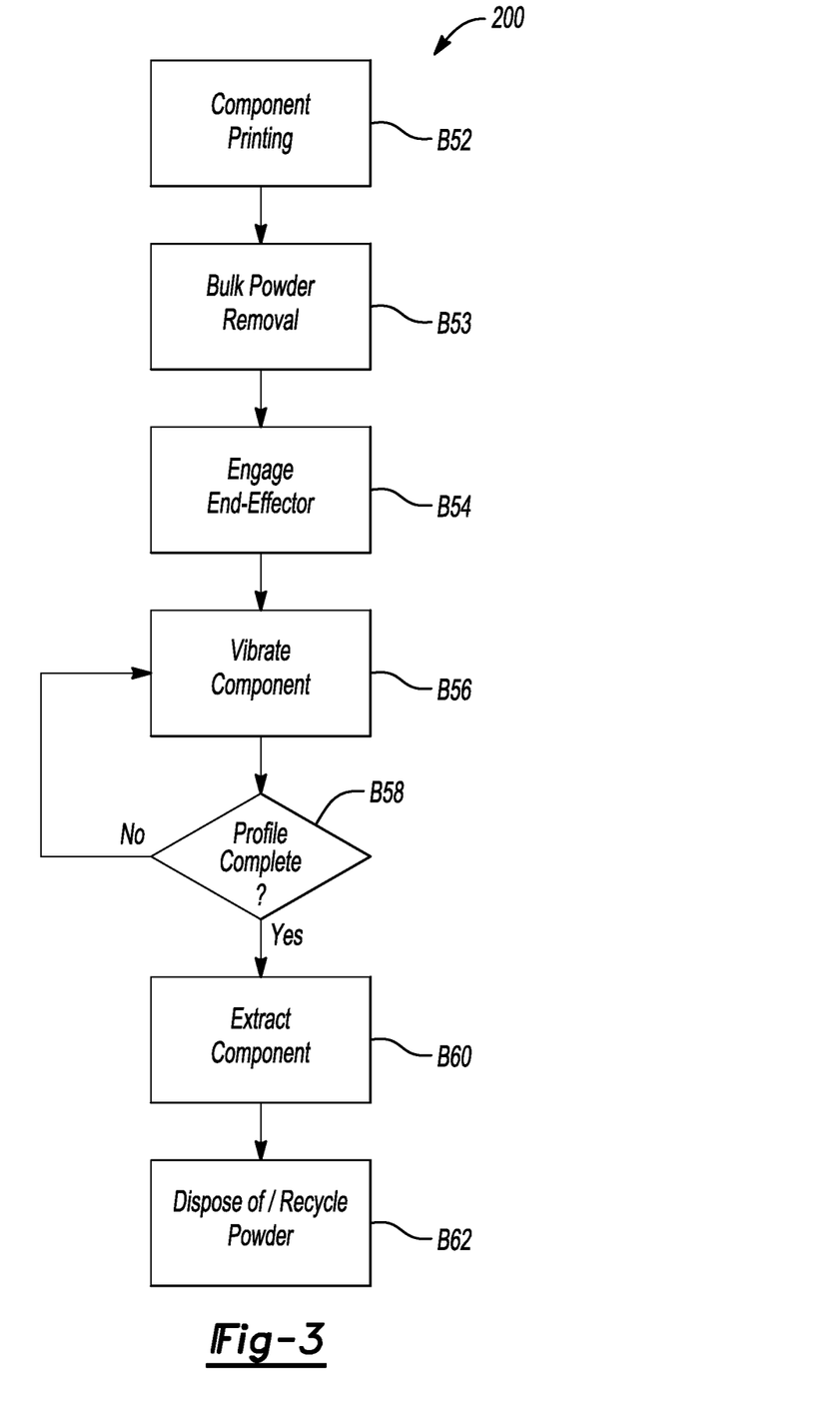
FIG. 3 is a flow chart describing an exemplary method for removing residual powder from a 3D-printed component.

Referring to FIG. 3, a process 200 for the removing residual powder 140 shown in FIG. 1 from an additive part, e.g., the exemplary 3D-printed component 12, commences at block B52 with 3D printing of the component 12 (Component Printing). Block B52 may entail uploading a 3D model of the finished component 12 into additive manufacturing/3D printing hardware and progressively constructing the component 12 in a layer-by-layer manner, e.g., using the laser or electron beam LL of the representative powder bed fusion system 10 shown schematically in FIG. 1. The process continues to block B53 when the component 12 has been printed.

Block B53 entails removal of bulk powder stock. As will be understood by those of ordinary skill in the art, a cake of powder stock will surround the 3D-printed component 12 upon completion of block B52. It may be more cost effective for an operator to remove most of this powder stock, e.g., 90 percent or more, using vacuum suction or other suitable means. Doing so will enable the subsequent blocks of the process 200 to function more efficiently when removing the remaining or residual powder stock. The process 200 then continues to block B54.

At block B54, the 3D-printed component 12 and the build plate 36 integrally formed therewith are engaged with the base 32 of the present end-effector 30. That is, the build plate 36 is inserted through the mating through-opening 33 defined by the base 32 and secured in place, such as via the perimeter fasteners 31. Once the build plate 36 is securely locked to the base 32 in this manner, the enclosure 38 of FIG. 2 may be secured to the base 32, e.g., by bolting the perimeter clamping ring 40 to the perimeter flange 41 as shown in FIG. 2 in order to form a leak-proof/hermetically sealed bubble or containment dome over the end-effector 30 and the component 12. The enclosure 38 would have a larger footprint than the build plate 36 and would extend slightly beyond the base 32 of the end-effector 30, such that the captive atmosphere surrounding the now-encapsulated component 12 within the powder containment cavity 39 may be evacuated through the service ports 60 of FIG. 2 using the vacuum device 62, while argon, nitrogen, or another inert gas is piped into the cavity 39 through the service ports 160 to pressurize the enclosure 38. The process then continues to block B56.

Block B56 includes vibrating the 3D-printed component 12 within the powder containment cavity 39 shown in FIG. 2 via operation of the transducers 42 described above. Such vibration occurs at a predetermined frequency or range thereof, such as by executing a predetermined vibration profile tailored to effective removal of residual powder 140 from the component 12. As part of block B56, the ECU 50 may also command the serial robot 22 of FIG. 1 to move in a particular manner in order to assist the vibration of the transducers 42. The process then proceeds to block B58.

Block B58 includes determining, via the ECU 50, whether the vibration profile selected and initiated at block B56 is complete. By way of example, a timer may be started at the onset of block B58 to commence transmission of vibration energy into the 3D-printed component 12 for a calibrated or predetermined duration sufficient for loosening the residual powder 140 from the component 12. Such a duration may be identified offline beforehand, e.g., using testing of the representative component 12, and stored in a memory location of or accessible by the ECU 50. Blocks B56 and B58 continue in a loop until the calibrated duration has elapsed, at which point the process continues to block B60.

Block B60 of FIG. 3 includes extracting the 3D-printed component 12 from the enclosure 38. Embodiments of block B60 may include removing the perimeter fasteners 43 or other restraining mechanisms to thereby detach the perimeter clamping ring 40 from the perimeter flange 41 surround the base 32. At this point, the build plate 36 and the component 12 remain integrally formed or welded together. The joined build plate 36 and component 12 will therefore progress through additional post-processing steps apart from the described process in order to cleanly separate the build plate 36 and stress treat the component 12, possibly followed by cleaning, polishing, burnishing, painting, or other surface finishing techniques. The process 200 proceeds to block B62.

At block B62, residual powder 140 that is vibrated free of the 3D-printed component 12 and collected within the powder containment cavity 39 may be properly disposed of or recycled. For example, the residual powder 140 contained within the cavity 39 may be vacuumed out of the enclosure 38 and directed into an external container (not shown) for disposal, or for recycling/reuse. The enclosure 38 in some embodiments may be cleaned, e.g., using pressurized air or water, and then reused. Alternatively, the enclosure 38 itself may be recyclable or disposable such that block B62 entails depositing the enclosure 38 alone or with its contents into a disposal bin. Depending on the composition of the residual powder 140, disposal in this manner may require specialized handling and disposal bins, and therefore the particular manner in which handling and disposal are conducted within the scope of block B62 may vary with the application.

The system 100 of FIG. 1, by using the end-effector 30 of FIG. 2 in accordance with the exemplary process 200 of FIG. 3, may be used as a solution to the prevailing problem of impacted residual powder within a 3D-printed component or additive part post-formation. The disclosed strategy seeks to encapsulate the component, which is exemplified herein as the representative component 12 of FIGS. 1 and 2 but encompassing other components having a wide range of possible sizes, shapes, and designs limited solely by the manufacturing capabilities of the particular AM process used to construct the component. Encapsulation beneath a dome-shaped or other suitably shaped enclosure, e.g., the example enclosure 38 described above, enables the component to be hermetically sealed within the illustrated powder containment cavity 39. Thereafter, targeted applications of ultrasonic or other vibration energy into the component gently shakes the residual powder free of the component, with collection of the residual powder within the enclosure possibly assisted by gravity and multi-axis control over the gross motion of the serial robot 22 shown in FIG. 1. These and other benefits will be readily appreciated by one of ordinary skill in the art in view of the foregoing disclosure.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A system for removing residual powder from a three-dimensional (3D)-printed component, wherein the component is integrally constructed with a build plate during an additive manufacturing (AM) process, the system comprising:
an end-effector having a planar base surrounded by a perimeter flange, wherein the end-effector includes a through-opening configured to receive the build plate;
a hemispherical dome enclosure;
an annular clamping ring configured to attach and seal the enclosure to the perimeter flange such that the hemispherical dome enclosure, the base, and the build plate collectively form a powder containment cavity encapsulating the 3D-printed component;
one or more transducers connected to the build plate and/or the planar base, and configured to vibrate at one or more predetermined frequencies in response to vibration control signals; and
an electronic control unit (ECU) in communication with the one or more transducers, wherein the ECU is configured to selectively transmit the vibration control signals to the one or more transducers during a post-processing stage of the AM process to thereby cause the one or more transducers to vibrate at the one or more predetermined frequencies for a duration sufficient for loosening the residual powder, with the residual powder thereafter captured within the powder containment cavity.

2. The system of claim 1, wherein the one or more predetermined frequencies includes an ultrasonic frequency.

3. The system of claim 1, wherein the build plate is a rectangular substrate or plate having opposing first and second major surfaces, the 3D-printed component is attached to and projects radially from the first major surface, and at least one of the one or more transducers is connected to the second major surface.

4. The system of claim 1, wherein the hemispherical dome enclosure is constructed of an impact-resistant transparent material.

5. The system of claim 4, wherein the impact-resistant transparent material is acrylic.

6. The system of claim 1, wherein the base includes at least one vacuum port configured to connect to a vacuum device, and at least one gas port configured to connect to a pressurized supply of an inert gas.

7. The system of claim 6, wherein the ECU is configured to selectively control the vacuum device and the pressurized supply of the inert gas to thereby vacate the powder containment cavity and thereafter fill the vacated powder containment cavity with the inert gas.

8. The system of claim 1, wherein the ECU is programmed with multiple vibration control profiles each corresponding to a different predetermined configuration of the 3D-printed component, and wherein the ECU is configured to selectively activate the one or more transducers using a selected one of the vibration control profiles corresponding to the actual configuration of the 3D-printed component.

9. The system of claim 8, further comprising: a human-machine interface device configured to transmit an electronic signal to the ECU indicative of the actual configuration.

10. The system of claim 1, further comprising: a serial robot connected to the end-effector such that the end-effector forms a distal end link of the serial robot, wherein the ECU is configured to control motion of the serial robot concurrently with selectively transmitting the vibration control signals to the one or more transducers.

11. A method for removing residual powder from a three-dimensional (3D)-printed component, comprising:
printing the 3D-printed component via an additive manufacturing (AM) process, wherein the 3D-printed component is integrally formed with a build plate during the AM process;
engaging the build plate using an end-effector having a planar base surrounded by a perimeter flange, including inserting the planar base into a through-opening of the build plate;
attaching a hemispherical dome enclosure to the end-effector via an annular clamping ring to thereby seal the hemispherical dome enclosure to the perimeter flange of the end-effector, wherein the hemispherical dome enclosure, the planar base, and the build plate collectively form a powder containment cavity fully encapsulating the 3D-printed component;

connecting one or more transducers to the build plate and/or the planar base, wherein the one or more transducers are configured to vibrate at one or more predetermined frequencies in response to vibration control signals;

transmitting the vibration control signals via an electronic control unit (ECU) to the one or more transducers during a post-processing stage of the AM process to thereby cause the one or more transducers to vibrate at the one or more predetermined frequencies for a duration sufficient for loosening the residual powder; and capturing the residual powder within the powder containment cavity.

12. The method of claim 11, wherein the predetermined frequencies include an ultrasonic frequency.

13. The method of claim 11, wherein the build plate is a rectangular substrate or plate having opposite first and second major surfaces, the component is attached to and projects radially from the first major surface, and connecting the one or more transducers includes connecting at least one of the one or more transducers to the second major surface.

14. The method of claim 11, wherein the hemispherical dome enclosure is a solid hemispherical dome constructed of transparent plastic material.

15. The method of claim 14, wherein the transparent plastic material is acrylic.

16. The method of claim 11, wherein the planar base includes at least one vacuum port and at least one gas port, the method further comprising: evacuating the powder containment cavity through the at least one vacuum port using a vacuum device, and thereafter pressurizing the powder containment cavity through the at least one gas port using a pressurized supply of an inert gas.

17. The method of claim 11, further comprising:
identifying an actual configuration of the 3D-printed component via the ECU;
selecting, from among a plurality of vibration control profiles programmed in memory of the ECU, a vibration control profile corresponding to the actual configuration of the 3D-printed component; and
activating the one or more transducers using the vibration control profile that corresponds to the actual configuration of the 3D-printed component.

18. The method of claim 17, further comprising:
connecting the end-effector to a serial robot such that the end-effector forms a distal end link of the serial robot; and
controlling motion of the serial robot via the ECU concurrently with activating the one or more transducers.

19. A system for removing residual powder from a three-dimensional (3D)-printed component, wherein the 3D-printed component is integrally constructed with a build plate during an additive manufacturing (AM) process, the system comprising:

an end-effector configured to connect to a distal end plate of a six-axis industrial robot, and having a circular base surrounded by an annular perimeter flange, wherein the end-effector includes a rectangular through-opening configured to receive the build plate, and wherein the circular base includes a pair of vacuum ports and a pair of gas ports respectively configured to connect to a vacuum pump a pressurized supply of argon or nitrogen;

a hemispherical dome enclosure constructed of transparent plastic;

an annular perimeter clamping ring configured to attach and seal the hemispherical dome enclosure to the annular perimeter flange of the end-effector, such that the hemispherical dome enclosure, the circular base, and the build plate collectively form a powder retention cavity fully encapsulating the 3D-printed component;

multiple transducers connected to the build plate on opposite major surfaces thereof, and configured, when selectively activated by vibration control signals, to vibrate at one or more predetermined ultrasonic frequencies for a duration sufficient for loosening the residual powder; and an electronic control unit (ECU) in communication with the six-axis industrial robot and the multiple transducers, and configured, during a post-processing stage of the AM process, to selectively transmit robot control signals to the six-axis industrial robot to control motion of the six-axis industrial robot while transmitting the vibration control signals to the one or more transducers, wherein vibration of the multiple transducers and motion of the six-axis industrial robot is configured to loosen and remove the residual powder from the 3D-printed component, such that the residual powder is thereafter captured within the powder containment cavity.

* * * * *